US008324863B2

(12) United States Patent
Nergaard (10) Patent No.: US 8,324,863 B2
(45) Date of Patent: Dec. 4, 2012

(54) TRICKLE CHARGER FOR HIGH-ENERGY STORAGE SYSTEMS (75) Inventor: Troy A. Nergaard, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 323 days.

(21) Appl. No.: 12/763,029

(22) Filed: Apr. 19, 2010

(65) Prior Publication Data
US 2011/0254512 A1 Oct. 20, 2011

(51) Int. Cl.
H02J 7/00 (2006.01)
(52) U.S. Cl. .......................................... 320/118; 320/145
(58) Field of Classification Search ................... 320/118
See application file for complete search history.

(56) References Cited

U.S. PATENT DOCUMENTS

| 4,536,696 A | * | 8/1985 | Ray | 320/140 |
| 5,500,579 A | * | 3/1996 | Kim et al. | 318/493 |
| 5,642,027 A | * | 6/1997 | Windes et al. | 320/166 |
| 5,963,066 A | * | 10/1999 | Fukunaga | 327/112 |
| 2001/0011880 A1 | * | 8/2001 | James | 320/104 |
| 2002/0047309 A1 | * | 4/2002 | Droppo et al. | 307/43 |
| 2003/0210025 A1 | * | 11/2003 | Ishii et al. | 323/284 |

* cited by examiner

Primary Examiner — Arun Williams
(74) Attorney, Agent, or Firm — Patent Law Offices of Michael E. Woods; Michael E. Woods (57) ABSTRACT A voltage converter for charging an energy storage module from an alternating current line voltage, includes a first charging stage, coupled to the energy storage module, converting the line voltage to a first rectified direct current module charging voltage communicated to the energy storage module, the first rectified direct current module charging voltage greater than the line voltage, the first charging stage including an inductance for communicating a first charging current to the energy storage module; a second charging stage, switchably coupled serially with the first charging stage, down-converting the alternating current line voltage to a second rectified direct current module voltage, the second rectified direct current module voltage less than the first rectified direct current module charging voltage, wherein the second charging stage produces a second charging current not greater than the first charging current; and a controller for selectably switching the second charging stage serially with the first charging stage when the line voltage has a peak value greater than a predefined relationship to a voltage of the energy storage module wherein the second charging stage communicates the second charging current to the energy storage module through the inductance.

21 Claims, 3 Drawing Sheets

TRICKLE CHARGER FOR HIGH-ENERGY STORAGE SYSTEMS

BACKGROUND OF THE INVENTION

The invention relates generally to charging of rechargeable energy storage systems (e.g., batteries and electric double-layer capacitors and the like) and more particularly to charging storage systems in conditions when a peak line voltage is greater than a storage system voltage due to a low state-of-charge (SOC).

Figure 1:
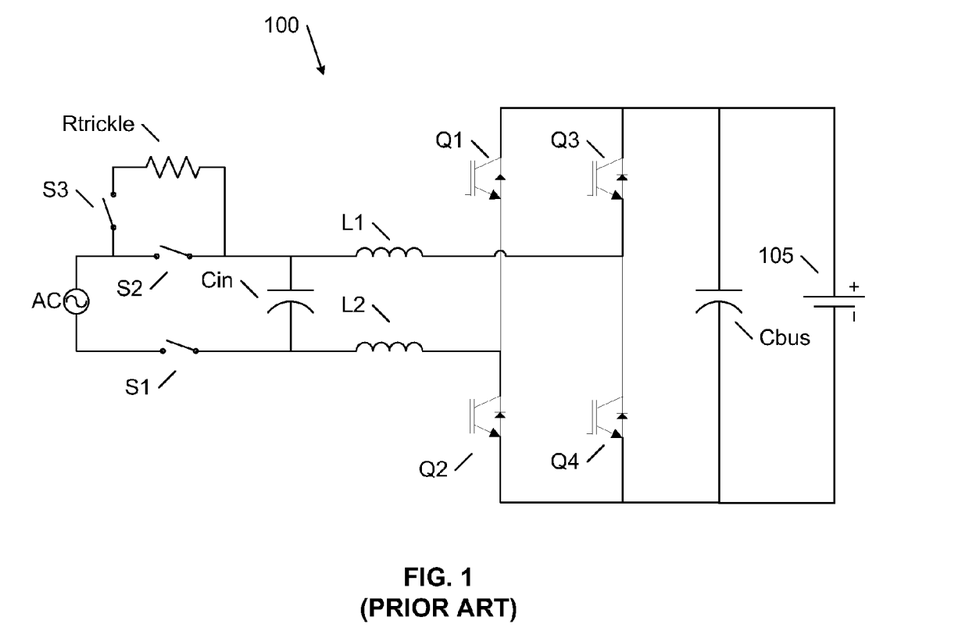
FIG. 1 is a prior art schematic block diagram representative of a voltage converter used in some charging systems installed onboard a electric vehicle to charge a high energy capacity energy storage assembly.

FIG. 1 is a prior art schematic block diagram representative of a voltage converter 100 used in some charging systems installed onboard an electric vehicle to charge a high energy capacity battery assembly 105. In general, circuit 100 describes a boost rectifier for an electric vehicle that includes a set of four transistors (Q1-Q4) having an output coupled to a smoothing capacitor Cbus in parallel with battery assembly 105 and an input coupled to an input filter capacitor Cin and a pair of inductors (L1 and L2). A pair of switches (S1 and S2) couple the inductors to an AC source, the AC source nominally providing 240 volts at about 70 amps. In normal operation, switch S1 and switch S2 are closed and S3 is open, and converter 100 operates in normal boost mode without difficulties.

There are situations wherein the line voltage provides a higher than peak voltage (e.g., +10% greater voltage or about 370 volts (e.g., VRMS*1.1*√2)) and battery assembly 105 is at a lower end of its SOC (e.g., ~330 volts) that voltage converter 100 cannot charge battery assembly 105 in the normal mode. (Voltage converter 100 cannot charge battery assembly 105 because the described relative voltages results in uncontrollable current flow out of the rectifier into $C_{bus}$ and into the battery assembly, potentially seriously damaging both of them.)

For this non-standard condition, voltage converter 100 includes resistor $R_{trickle}$ and a switch S3. Switch S1 and switch S3 are closed and switch S2 is opened, and $R_{trickle}$ then reduces input voltage applied to the boost rectifier. In some implementations, one-half of the input voltage is dropped across $R_{trickle}$, greatly reducing the effective voltage applied to converter 100 (with about 7 amps of charging current available in this trickle charge mode). Voltage converter 100 operates in this non-standard mode until the relative voltage conditions between AC line-in voltage and the voltage level of energy storage assembly 105 is sufficient to reconfigure the converter to normal mode operation (i.e., opening switch S3 and closing switch S2).

While this solution is acceptable in many applications, as storage voltages decrease, it becomes increasingly likely that there is a need for non-standard operation to account for $V_{bat}$ being lower than the experienced peak voltage from the AC line-in. The solution shown in FIG. 1 is very lossy and because of the greatly reduced current flow ($I_{tickle}$), it is particularly disadvantageous the more frequently that the solution is employed.

In the case of solutions to be applied to electric vehicles, there are often tight budgets for space, weight and component costs. Conventional methodologies for solving the problem addressed by the trickle mode shown in FIG. 1 include addition of separate converters to handle each special case of relative line voltage/SOC conditions or changing the system to employ an isolated topology.

Adding separate converters is viewed as undesirable because of extra costs and space. The components in the converters are high performance components configured for this high power/high energy operation and are more expensive than many lower power options. An isolated topology often produces a less efficient solution. Thus neither conventional solution is optimal.

A further drawback of the solution shown in FIG. 1 is that there are situations in which a voltage level of the battery assembly is so low that it would be unsafe to attempt to restore function by trickle charging.

What is needed is a voltage converter that is capable of providing high energy to a high performance energy storage assembly for charging the energy storage assembly while efficiently and safely handling conditions of a too "high" line-in voltage relative to a voltage level of the energy storage assembly while also being capable of use in reviving a battery assembly having a very low level state-of-charge.

BRIEF SUMMARY OF THE INVENTION

Disclosed are methods and systems for a voltage converter that is capable of providing high energy to a high performance energy storage assembly for charging the energy storage assembly while efficiently and safely handling non-standard conditions while also being capable of use in reviving a battery assembly having a very low level state-of-charge. There are two disclosed embodiments, differing in implementation of power factor correction in the "normal" mode. It is to be understood that either implementation may be altered to include or not include power factor correction in normal operation, with power factor correction unavailable in auxiliary operation. A voltage converter for charging an energy storage module from an alternating current line voltage, includes a first charging stage, coupled to the energy storage module, converting the line voltage to a first rectified direct current module charging voltage communicated to the energy storage module, the first rectified direct current module charging voltage greater than the line voltage, the first charging stage including an inductance for communicating a first charging current to the energy storage module; a second charging stage, switchably coupled serially with the first charging stage, down-converting the alternating current line voltage to a second rectified direct current module voltage, the second rectified direct current module voltage less than the first rectified direct current module charging voltage, wherein the second charging stage produces a second charging current not greater than the first charging current; and a controller for selectably switching the second charging stage serially with the first charging stage when the line voltage has a peak value greater than a predefined relationship to a voltage of the energy storage module wherein the second charging stage communicates the second charging current to the energy storage module through the inductance.

A power factor correcting voltage converter for charging an energy storage module from an alternating current line voltage, including a rectifier for converting the line voltage to a rectified direct current voltage provided across a first output node and a second output node; a first charging stage, coupled to the energy storage module, converting the rectified direct current voltage to a first rectified direct current module charging voltage communicated to the energy storage module, the first rectified direct current module charging voltage greater than the line voltage, the first charging stage including an inductance for communicating a first charging current to the energy storage module; a second charging stage, coupled to the outputs of the rectifier and switchably coupled serially with the first charging stage, down-converting the rectified direct current voltage to a second rectified direct current module voltage, the second rectified direct current module voltage less than the first rectified direct current module charging voltage, wherein the second charging stage produces a second charging current not greater than the first charging current; and a controller for selectably switching the second charging stage serially with the first charging stage when the line voltage has a peak value greater than a predefined relationship to a voltage of the energy storage module wherein the second charging stage communicates the second charging current to the energy storage module through the inductance.

A method for charging an energy storage module from an alternating current line voltage, the method including (a) converting, using a first charging stage coupled to the energy storage module, the line voltage to a first rectified direct current module charging voltage communicated to the energy storage module, the first rectified direct current module charging voltage greater than the line voltage, the first charging stage including an inductance for communicating a first charging current to the energy storage module; (b) down-converting, using a second charging stage switchably coupled serially with the first charging stage, the alternating current line voltage to a second rectified direct current module voltage, the second rectified direct current module voltage less than the first rectified direct current module charging voltage, wherein the second charging stage produces a second charging current not greater than the first charging current; and (c) switching selectably the second charging stage serially with the first charging stage when the line voltage has a peak value greater than a predefined relationship to a voltage of the energy storage module wherein the second charging stage communicates the second charging current to the energy storage module through the inductance.

A method for charging of an energy storage module from an alternating current line voltage, the method including (a) converting the line voltage to a rectified direct current voltage provided across a first output node and a second output node; (b) converting the rectified direct current voltage to a first rectified direct current module charging voltage communicated to the energy storage module, the first rectified direct current module charging voltage greater than the line voltage, the first charging stage including an inductance for communicating a first charging current to the energy storage module; (c) down-converting the rectified direct current voltage to a second rectified direct current module voltage, the second rectified direct current module voltage less than the first rectified direct current module charging voltage, wherein the second charging stage produces a second charging current not greater than the first charging current; and (d) switching selectably the second charging stage serially with the first charging stage when the line voltage has a peak value greater than a predefined relationship to a voltage of the energy storage module wherein the second charging stage communicates the second charging current to the energy storage module through the inductance.

Simplistically, the preferred embodiments of the present invention provide for a standard boost stage to up-convert line voltage to $V_{Storage}$. In non-standard conditions when a peak voltage of the line voltage exceeds the energy storage voltage (such as can happen with a low state-of-charge for an energy storage module), an auxiliary pole converter is switched in-line with the boost stage. This auxiliary pole converter down-converts the input voltage and provides a reduced charging current to the energy storage module as long as the non-standard condition exists. Expensive components (e.g., high-energy inductance(s)) are reused by directing the reduced charging current through the boost stage, typically the boost stage is reconfigured as well. A controller disables most boosting and rectification of the boost stage in the non-standard mode operation, the specifics vary based upon the specific topology of the stages and application.

DETAILED DESCRIPTION OF THE INVENTION

Embodiments of the present invention provide methods and systems for a voltage converter that is capable of providing high energy to a high performance energy storage assembly for charging the energy storage assembly while efficiently and safely handling conditions of large relative differences between a line-in voltage and voltage level of the energy storage assembly while also being capable of use in reviving a energy storage assembly having a very low level state-of-charge. The following description is presented to enable one of ordinary skill in the art to make and use the invention and is provided in the context of a patent application and its requirements. In the following text, the terms "energy storage assembly" "battery", "cell", "battery cell" and "battery cell pack" "electric double-layer capacitor" and "ultracapacitor" may be used interchangeably (unless the context indicates otherwise" and may refer to any of a variety of different rechargeable configurations and cell chemistries including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other chargeable high energy storage type/configuration.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 2:
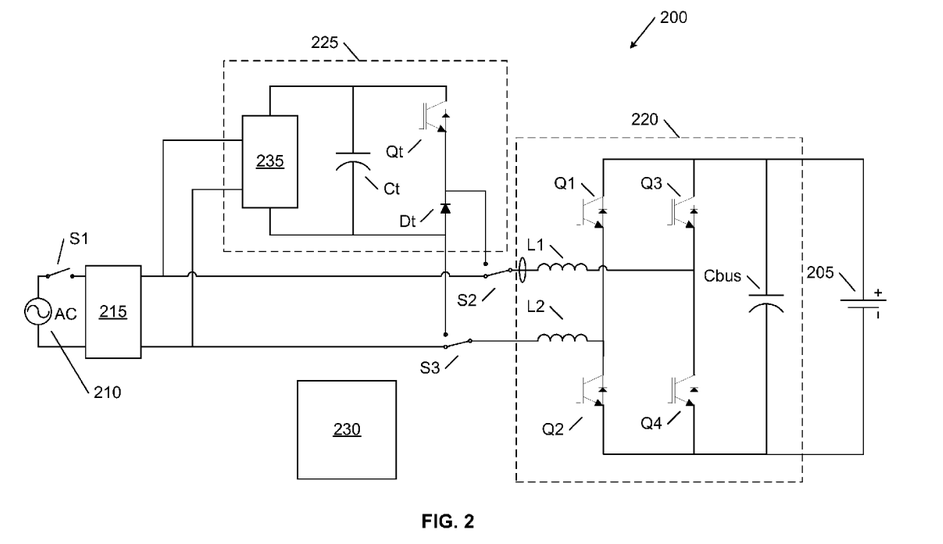
FIG. 2 is a schematic block diagram of a bi-directional power factor correcting voltage converter providing high energy to a high performance energy storage assembly for charging the energy storage assembly.

FIG. 2 is a schematic block diagram of a bi-directional power factor correcting voltage converter 200 providing high energy to a high performance energy storage assembly 205 for charging energy storage assembly 205 while efficiently and safely handling conditions of large relative differences between a line-in voltage from an AC source 210 and a voltage level of energy storage assembly 205. AC source 210, e.g., 240 volts, is coupled to an input of an optional EMI filter 215 having an output coupled to a switching assembly including a pair of single-pole-double-throw switches (switch S2 and switch S3). A first output port of EMI filter 215 is coupled to a first throw of switch S2 and a second output port of EMI filter 215 is coupled to a first throw of switch S3. The switching assembly, responsive to its state, couples either (i) filtered line voltage from AC source 210 to a boost rectifier 220 or (ii) an auxiliary pole converter 225 to a modified boost rectifier 220. A second throw of switch S2 and of switch S3 are coupled to auxiliary pole converter 225 and the first poles of switch S2 and of switch S3 are coupled to boost rectifier 220.

It will be appreciated that, due to the large power requirements, that one or more of the switches (particularly switch S2 and switch S3) will be implemented by one or more contactors (e.g., relays or the like).

In standard operation, the switching assembly communicates the filtered line voltage from AC source 210 to boost rectifier 220 and then to energy storage assembly 205 to provide a standard charging current, for example a charging current of about 70 amps. The switching assembly does this by coupling the poles of switch S2 and of switch S3 to the first throws, respectively. In the special voltage condition situation, the switching assembly disconnects EMI filter 215 from direct communication with boost rectifier 220 and communicates auxiliary pole converter 225 to energy storage assembly 205 through a modified boost rectifier 220. Auxiliary converter 225 provides a "trickle" current (the trickle current may have substantial amps but is less than or equal to the standard charging current), for example in the preferred embodiment the trickle current is about 35 amps in contrast to a standard charging current of 70 amps. The switching assembly does this by coupling the poles of switch S2 and of switch S3 to the second throws, respectively. A controller 230 sets the desired states and operation for the switches, transistors, and components of converter 200 as described herein.

Boost rectifier 220 may be constructed in various ways, a preferred implementation is shown in FIG. 2. Boost rectifier 220 of the preferred implementation includes a pair of high current inductances (L1 and L2—though this implementation may be accomplished with a single inductance) having first nodes coupled to a pole of switch S2 and switch S3 respectively and second nodes coupled to a full rectifying bridge having four NPN insulated gate bipolar transistors Q1-Q4 (IGBTs) and a smoothing capacitor $C_{bus}$. (In some implementations, a set of MOSFETs may be used.) EMI filter 215 has a first output port coupled to a first throw of switch S2. The second node of inductance L1 is coupled to an emitter of transistor Q3 and a collector of transistor Q4. EMI filter 215 has a second output port coupled to a first throw of switch S3. The second node of inductance L2 is coupled to an emitter of transistor Q1 and a collector of transistor Q2. The collectors of transistor Q1 and transistor Q3 are coupled to a first plate of smoothing capacitor $C_{bus}$ and a first terminal of energy storage assembly 205. The emitters of transistor Q2 and transistor Q4 are coupled to a second plate of smoothing capacitor $C_{bus}$ and to a second terminal of energy storage assembly 205. The components of boost rectifier 220 are sized for very high current levels, such as for example, currents used in charging the energy storage modules of an electric vehicle or other automotive or industrial application. As indicated above, these currents may be on the order of about 70 amps in the preferred embodiment.

As noted above, there are times when the line-in voltage from AC source 210 is high and the voltage of energy storage assembly 205 is low that converter 200 does not operate properly without auxiliary converter 225 switched in-line. Controller 230 detects this voltage condition and reconfigures converter 200 by switching in auxiliary pole converter 225 and modifying operation of boost rectifier 220. To increase efficiency from reusing components, auxiliary pole converter 225 is switched in at the correct location to reuse inductances L1 and L2 which requires reconfiguration of transistors Q1-Q4 as well to disable rectification and boosting in boost rectifier 220.

Auxiliary pole converter 225 includes a rectifier 235, an NPN IGBT $Q_t$, a diode $D_t$, and a filter capacitor $C_t$. When auxiliary pole converter 225 is switched in by coupling the poles of switch S2 and switch S3 to the second throws, respectively, controller 230 statically turns transistor Q2 and Q3 to the "ON" state. A first input port of rectifier 235 is coupled to the first output port of EMI filter 215 and a second input port of rectifier 235 is coupled to the second output port of EMI filter 215. A first rectified voltage node of rectifier 235 is coupled to a first plate of filter capacitor $C_t$ and to a collector of transistor $Q_t$. A second rectified voltage node of rectifier 235 is coupled to a second plate of filter capacitor $C_t$, to an anode of diode $D_t$, and to a second throw of switch S3. A cathode of diode $D_t$ is coupled to an emitter of transistor $Q_t$ and to a second throw of switch S2.

Converter 200 controls current by switching transistor $Q_t$. Components of auxiliary pole converter 225 are advantageously sized to be larger and supply a greater auxiliary trickle current than that provided by the prior art, in a more efficient manner, but still less charging current than the standard charging current. For example, the preferred implementation sizes the components of auxiliary pole converter 225 to provide about 35 amps of trickle current efficiently in contrast to the 7 amps provided by the prior art in a lossy manner. The efficiencies of the present invention include less energy lost through heat and less time spent in the trickle charge mode, resulting in a doubly efficient solution. Additionally, as noted it is possible that with different energy storage module designs, it may become the case that converter 200 will operate more frequently in the special condition mode that would require more frequent use of auxiliary pole converter 225. The more often that auxiliary pole converter 225 is needed, the greater the advantages of using the present invention, particularly in the high-performance automotive and industrial applications using high-performance energy storage modules.

Rectifier 220 does implement power factor correction in standard mode (it can do power factor correction in standard mode but it will not do power factor correction in auxiliary mode). For many implementations, power factor correction may not be a requirement, particularly as the non-standard charge situation addressed by auxiliary pole converter 225 is expected to be a temporary transient condition, and because of the present design providing significantly greater trickle currents, the time that the auxiliary pole is switched is greatly reduced. However, for some applications power factor correction may be required or desired.

Figure 3:
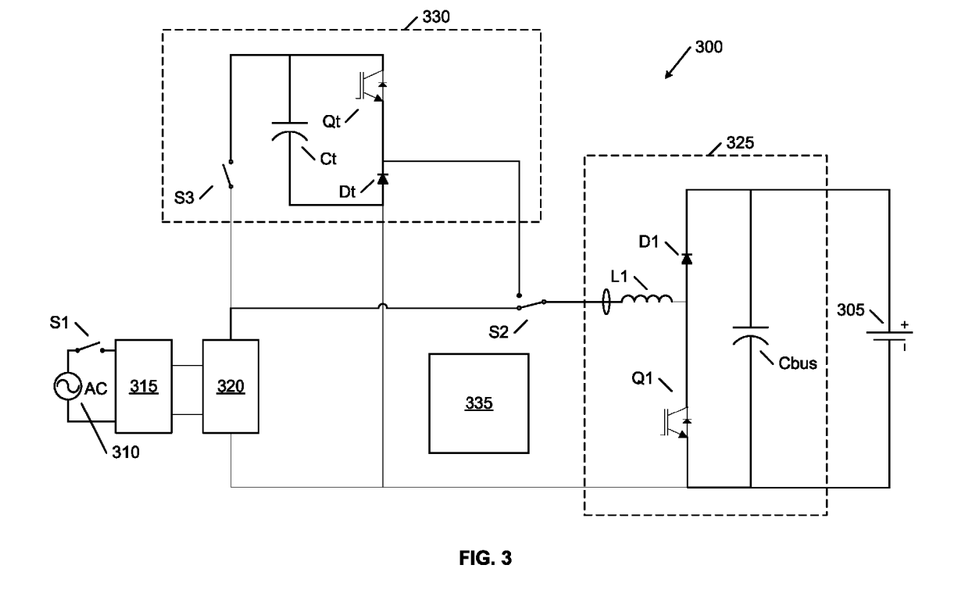
FIG. 3 is a schematic block diagram of a power factor correcting voltage converter providing high energy to a high performance energy storage assembly for charging the energy storage assembly.

FIG. 3 is a schematic block diagram of a power factor correcting voltage converter 300 providing high energy to a high performance energy storage assembly 305 for charging energy storage assembly 305 while efficiently and safely handling conditions of large relative differences between a line-in voltage from an AC source 310 and a voltage level of energy storage assembly 305. AC source 310, e.g., 240 volts, is coupled to an input of an EMI filter 315 having an output coupled to an input of a rectifier 320. Rectifier 320 includes a first rectified voltage node which is coupled to a first throw of a single pole, double throw switch S2. The pole of switch S2 is coupled to a converter stage 325 and a second throw of switch S2 is couple to an auxiliary pole converter 330. It will be appreciated that, due to the large power requirements, that one or more of the switches (particularly switch S2) will be implemented by one or more contactors (e.g., relays or the like).

In standard operation, the pole of switch S2 is coupled to the first throw which communicates the filtered rectified line voltage from AC source 310 to converter stage 325 and then to energy storage assembly 305. In the special voltage condition situation, switch S2 communicates auxiliary pole converter 330 to energy storage assembly 305 through a modified converter stage 325 by coupling the pole of switch S2 to the second throw. Auxiliary converter 330 provides a "trickle" current (the trickle current may have substantial amps but is less than or equal to the standard charging current), for example in the preferred embodiment the trickle current is about 35 amps in contrast to a standard charging current of 70 amps. A controller 335 sets the desired states and operation for the switches, transistors, and components of converter 300.

Converter stage 325 may be constructed in various ways, a preferred implementation is shown in FIG. 3. Converter stage 325 of the preferred implementation includes a high current inductance L1 having a first node coupled to a pole of switch S2 and a second node coupled to both an anode of a diode D1 and to a collector of an NPN IGBT Q1. A cathode of diode D1 is coupled to a first plate of a smoothing capacitor $C_{bus}$ and a first terminal of energy storage assembly 305. An emitter of transistor Q1 is coupled to a second rectified voltage node of rectifier 320, a second plate of smoothing capacitor $C_{bus}$ and a second terminal of energy storage assembly 305. The components of converter stage 325 are sized for very high current levels, such as for example, currents used in charging the energy storage modules of an electric vehicle or other automotive or industrial application. As indicated above, these currents may be on the order of about 70 amps in the preferred embodiment.

As noted above, there are times when the line-in voltage from AC source 310 is high and the voltage on energy storage assembly 305 is low that converter 300 does not operate properly without auxiliary converter 330 switched in-line. Controller 335 detects this condition and reconfigures converter 300 by switching in auxiliary pole converter 330 (changing throws of switch S2 and closing switch S3) and reconfiguring operation of converter stage 325. To increase efficiency from reusing components and to provide power factor correction, auxiliary pole converter 330 is switched in at the correct location to reuse rectifier 320 and inductance L1 and controller 335 statically turns transistor Q1 "OFF" which puts diode D1 in series with inductance L1 (and disables boosting of converter stage 325).

Auxiliary pole converter 330 includes an NPN IGBT $Q_t$, a diode $D_t$, and a filter capacitor $C_t$. A first terminal of a single pole single throw switch S3 is coupled to the first rectified voltage node of rectifier 320. A second terminal of switch S3 is coupled to a first plate of filter capacitor $C_t$ and to a collector of transistor $Q_t$. A second plate of filter capacitor $C_t$ is coupled to the second rectified voltage node of rectifier 320 and to an anode of diode $D_t$. A cathode of diode $D_t$ is coupled to an emitter of transistor $Q_t$ and to a second throw of switch S2.

When auxiliary pole converter 330 is switched in, controller 335 statically turns Q1 to the "OFF" state. Converter 300 controls current in the special mode as auxiliary converter 330 acts as a buck converter reducing the line in voltage. Components of auxiliary pole converter 330 are advantageously sized to be larger and supply a greater auxiliary trickle current than that provided by the prior art, in a more efficient manner, but still less than or equal to the standard charging current. For example, the preferred implementation sizes the components of auxiliary pole converter 330 to provide about 35 amps of trickle current efficiently in contrast to the 7 amps provided by the prior art in a lossy manner. The efficiencies of the present invention include less energy lost through heat and less time spent in the trickle charge mode, resulting in a doubly efficient solution. Additionally, as noted it is possible that with different energy storage module designs, it may become the case that converter 300 will operate more frequently in the special condition mode that would require more frequent use of auxiliary pole converter 330. The more often that auxiliary pole converter 330 is needed, the greater the advantages of using the present invention, particularly in the high-performance automotive and industrial applications using high-performance energy storage modules.

It is also an attendant advantage of the disclosed embodiments that the voltage level from the auxiliary pole converters may be bucked down sufficiently low that the auxiliary pole converter voltages from converter 200 and converter 300 may be used in safely reviving a damaged battery module. The prior art is unable to provide a safe voltage for recharging such a battery module using the voltage drop across a resistor.

The system above has been described in the preferred embodiment of charging a multicell energy storage module used in electric vehicle (EV) systems. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A voltage converter for charging an energy storage module from an alternating current line voltage, comprising:
    a first charging stage, coupled to the energy storage module, converting the line voltage to a first rectified direct current module charging voltage communicated to the energy storage module, the first rectified direct current module charging voltage greater than the line voltage, the first charging stage including an inductance for communicating a first charging current to the energy storage module;
    a second charging stage, switchably coupled serially with the first charging stage, down-converting the alternating current line voltage to a second rectified direct current module voltage, the second rectified direct current module voltage less than the first rectified direct current module charging voltage, wherein the second charging stage produces a second charging current not greater than the first charging current; and
    a controller for selectably switching the second charging stage serially with the first charging stage when the line voltage has a peak value greater than a predefined relationship to a voltage of the energy storage module wherein the second charging stage communicates the second charging current to the energy storage module through the inductance.

2. The voltage converter of claim 1 wherein the first charging stage includes a boost rectifier, wherein the inductance includes a first inductance and a second inductance with the inductances communicated to the line voltage, and wherein the boost rectifier includes an active full-wave rectifier having a first input coupled through the first inductance to the line voltage, a second input coupled through the second inductance to the line voltage, a first output coupled to a first terminal of the energy storage module, and a second output coupled to a second terminal of the energy storage module.

3. A voltage converter for charging an energy storage module from an alternating current line voltage, comprising:
    a first charging stage, coupled to the energy storage module, converting the line voltage to a first rectified direct current module charging voltage communicated to the energy storage module, the first rectified direct current module charging voltage greater than the line voltage, the first charging stage including an inductance for communicating a first charging current to the energy storage module;
    a second charging stage, switchably coupled serially with the first charging stage, down-converting the alternating current line voltage to a second rectified direct current module voltage, the second rectified direct current module voltage less than the first rectified direct current module charging voltage, wherein the second charging stage produces a second charging current not greater than the first charging current; and
    a controller for selectably switching the second charging stage serially with the first charging stage when the line voltage has a peak value greater than a predefined relationship to a voltage of the energy storage module wherein the second charging stage communicates the second charging current to the energy storage module through the inductance;
    wherein the second charging stage includes an auxiliary pole converter, wherein the inductance includes a first inductance and a second inductance, and wherein the auxiliary pole converter includes a rectifier and a step-down voltage converter generating the second rectified direct current module voltage, the auxiliary pole converter providing the second charging current to the energy storage module through the inductances.

4. A voltage converter for charging an energy storage module from an alternating current line voltage, comprising:
    a first charging stage, coupled to the energy storage module, converting the line voltage to a first rectified direct current module charging voltage communicated to the energy storage module, the first rectified direct current module charging voltage greater than the line voltage, the first charging stage including an inductance for communicating a first charging current to the energy storage module;
    a second charging stage, switchably coupled serially with the first charging stage, down-converting the alternating current line voltage to a second rectified direct current module voltage, the second rectified direct current module voltage less than the first rectified direct current module charging voltage, wherein the second charging stage produces a second charging current not greater than the first charging current; and
    a controller for selectably switching the second charging stage serially with the first charging stage when the line voltage has a peak value greater than a predefined relationship to a voltage of the energy storage module wherein the second charging stage communicates the second charging current to the energy storage module through the inductance;
    wherein the first charging stage includes a boost rectifier, wherein the inductance includes a first inductance and a second inductance with the inductances communicated to the line voltage, and wherein the boost rectifier includes an active full-wave rectifier having a first input coupled through the first inductance to the line voltage, a second input coupled through the second inductance to the line voltage, a first output coupled to a first terminal of the energy storage module, and a second output coupled to a second terminal of the energy storage module; and
    wherein the second charging stage includes an auxiliary pole converter and wherein the auxiliary pole converter includes a second rectifier and a step-down voltage converter generating the second rectified direct current voltage, the auxiliary pole converter providing the second charging current to the energy storage module through the inductances when the inductances are communicated to the line voltage through the rectifier of the auxiliary pole converter.

5. The voltage converter of claim 4 wherein the controller disables rectification by the boost rectifier when the auxiliary pole converter is providing the second charging current through the inductances.

6. The voltage converter of claim 1 wherein the predefined relationship for the line voltage is in the range of about 85% to about 99.9% of the voltage on the energy storage module.

7. The voltage converter of claim 3 wherein the step-down voltage converter includes a buck converter.

8. The voltage converter of claim 4 wherein the step-down voltage converter includes a buck converter.

9. A power factor correcting voltage converter for charging an energy storage module from an alternating current line voltage, comprising:
 a rectifier for converting the line voltage to a rectified direct current voltage provided across a first output node and a second output node;
 a first charging stage, coupled to the energy storage module, converting the rectified direct current voltage to a first rectified direct current module charging voltage communicated to the energy storage module, the first rectified direct current module charging voltage greater than the line voltage, the first charging stage including an inductance for communicating a first charging current to the energy storage module;
 a second charging stage, coupled to the outputs of the rectifier and switchably coupled serially with the first charging stage, down-converting the rectified direct current voltage to a second rectified direct current module voltage, the second rectified direct current module voltage less than the first rectified direct current module charging voltage, wherein the second charging stage produces a second charging current not greater than the first charging current; and
 a controller for selectably switching the second charging stage serially with the first charging stage when the line voltage has a peak value greater than a predefined relationship to a voltage of the energy storage module wherein the second charging stage communicates the second charging current to the energy storage module through the inductance.

10. The voltage converter of claim 9 wherein the first charging stage includes a boost converter, wherein the inductance is communicated to the rectified direct current voltage, and wherein the boost converter includes a first input coupled through the inductance to the rectifier, a second input coupled to the rectifier, a first output coupled to a first terminal of the energy storage module, and a second output coupled to a second terminal of the energy storage module.

11. The voltage converter of claim 9 wherein the second charging stage includes an auxiliary pole converter having a step-down voltage converter generating the second rectified direct current module voltage, the auxiliary pole converter providing the second charging current to the energy storage module through the inductance.

12. The voltage converter of claim 10 wherein the second charging stage includes an auxiliary pole converter having a step-down voltage converter generating the second rectified direct current module voltage, the auxiliary pole converter providing the second charging current to the energy storage module through the inductance.

13. The voltage converter of claim 12 wherein the controller disables voltage boosting by the boost converter when the auxiliary pole converter is providing the second charging current through the inductance.

14. The voltage converter of claim 9 wherein the predefined relationship for the peak line voltage is in the range of about 85% to about 99.9% of the voltage on the energy storage module.

15. The voltage converter of claim 11 wherein the step-down voltage converter includes a buck converter.

16. The voltage converter of claim 12 wherein the step-down voltage converter includes a buck converter.

17. A method for charging an energy storage module from an alternating current line voltage, the method comprising the steps of:
 (a) converting, using a first charging stage coupled to the energy storage module, the line voltage to a first rectified direct current module charging voltage communicated to the energy storage module, the first rectified direct current module charging voltage greater than the line voltage, the first charging stage including an inductance for communicating a first charging current to the energy storage module;
 (b) down-converting, using a second charging stage switchably coupled serially with the first charging stage, the alternating current line voltage to a second rectified direct current module voltage, the second rectified direct current module voltage less than the first rectified direct current module charging voltage, wherein the second charging stage produces a second charging current not greater than the first charging current; and
 (c) switching selectably the second charging stage serially with the first charging stage when the line voltage has a peak value greater than a predefined relationship to a voltage of the energy storage module wherein the second charging stage communicates the second charging current to the energy storage module through the inductance.

18. The charging method of claim 17 wherein selectable switching step (c) disables rectification and voltage boosting of the first charging stage.

19. A method for charging of an energy storage module from an alternating current line voltage, the method comprising the steps of:
 (a) converting the line voltage to a rectified direct current voltage provided across a first output node and a second output node;
 (b) converting the rectified direct current voltage to a first rectified direct current module charging voltage communicated to the energy storage module, the first rectified direct current module charging voltage greater than the line voltage, the first charging stage including an inductance for communicating a first charging current to the energy storage module;
 (c) down-converting the rectified direct current voltage to a second rectified direct current module voltage, the second rectified direct current module voltage less than the first rectified direct current module charging voltage, wherein the second charging stage produces a second charging current not greater than the first charging current; and
 (d) switching selectably the second charging stage serially with the first charging stage when the line voltage has a peak value greater than a predefined relationship to a voltage of the energy storage module wherein the second charging stage communicates the second charging current to the energy storage module through the inductance.

20. The charging method of claim 19 wherein selectable switching step (d) disables voltage boosting of the first charging stage.

21. A voltage converter charging an energy storage module from an alternating current line voltage, comprising:

a first charging stage, coupled to the energy storage module, said first charging stage having a first operational mode configured by a first set of control signals and a second operational mode configured by a second set of control signals, said first operational mode converting the line voltage to a first rectified direct current module charging voltage communicated to the energy storage module, said first rectified direct current module charging voltage greater than the line voltage, said first charging stage including an inductance for communicating a first charging current to the energy storage module with said first operational mode including a rectification and a boosting of the line voltage and said second operational mode disabling said rectification and said boosting;

a second charging stage, selectably switchably coupled serially with said first charging stage, down-converting the line voltage to a second rectified direct current module voltage, said second rectified direct current module voltage less than said first rectified direct current module charging voltage, wherein said second charging stage produces a second charging current not greater than the first charging current; and a controller, coupled to said charging stages, providing said first set of control signals to said first charging stage when the line voltage has a peak value not greater than a predefined relationship to a voltage of the energy storage module wherein said first charging stage communicates said first rectified direct current module charging voltage to the energy storage module and wherein said controller selectably switches the second charging stage serially with the first charging stage when the line voltage has said peak value greater than said predefined relationship to said voltage of the energy storage module wherein said second charging stage communicates said second charging current to the energy storage module through said inductance and said first charging stage with said controller providing said second set of control signals to said first charging stage while said second charging stage communicates the second charging current to the energy storage module through said inductance and said first charging stage.

* * * * *